(No Model.)

A. DIEBOLD.
HORSE TAIL HOLDER.

No. 461,496. Patented Oct. 20, 1891.

WITNESSES:
E. L. Sherman
Wm. D. Bell

INVENTOR:
Anton Diebold
BY Gartner & Co.
ATTORNEY

UNITED STATES PATENT OFFICE.

ANTON DIEBOLD, OF HARRISON, NEW JERSEY.

HORSE-TAIL HOLDER.

SPECIFICATION forming part of Letters Patent No. 461,496, dated October 20, 1891.

Application filed June 12, 1891. Serial No. 395,973. (No model.)

*To all whom it may concern:*

Be it known that I, ANTON DIEBOLD, a subject of the King of Bavaria, Germany, residing at Harrison, Hudson county, and State of New Jersey, have invented certain new and useful Improvements in Protectors for Horses' Tails; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide an ornamental attachment to the tail of a horse and also serve as a protector when the horse is being transported or in any position where rubbing or abrasion of the tail may occur, useful as a mark or designation whereby any particular horse or animal may be identified, economical in construction, and readily applied.

The invention consists in the improved tail ornament and protector for horses or other animals and the arrangement and combination of the various parts thereof, substantially as will be hereinafter more fully described, and finally embodied in the claims.

Figure 1:
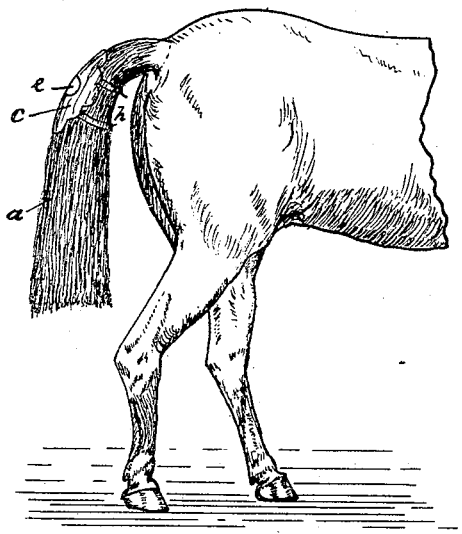
Figure 2:
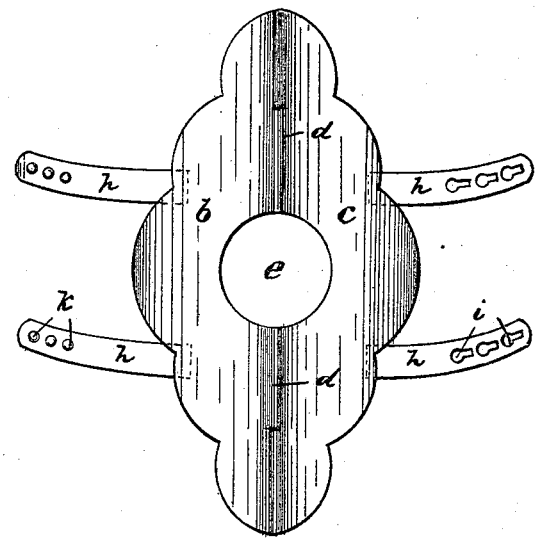
Figure 4:
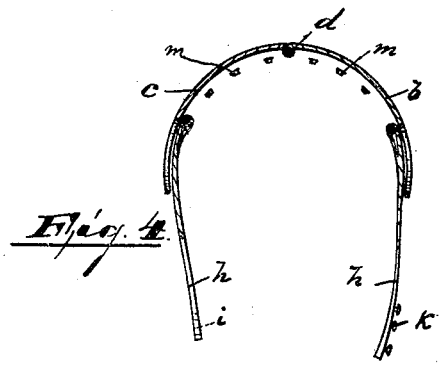
Figure 5:
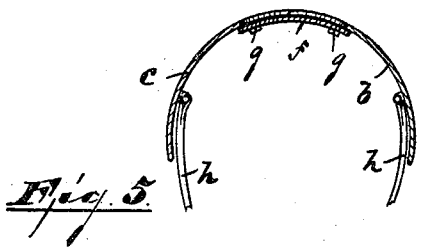
Figure 3:
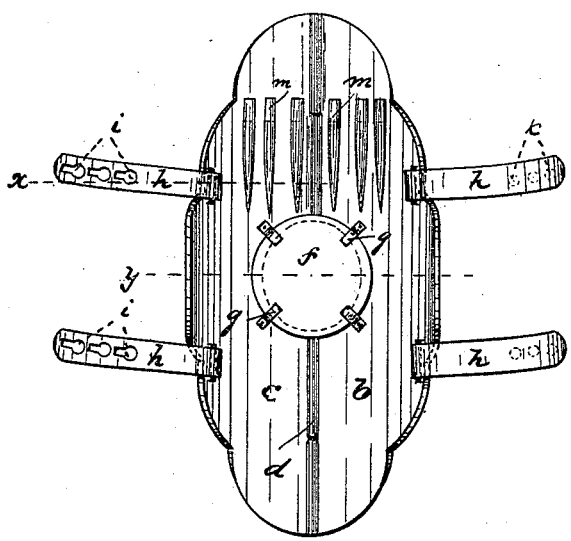

Referring to the accompanying drawings, in which like letters of reference indicate corresponding parts in each of the several views, Figure 1 is a side view of the rear portion of a horse, showing my improvement applied to the tail. Fig. 2 is a front view of the protector partly opened on its hinge, showing the securing-straps and a central opening. Fig. 3 is a rear view with the central opening closed by a plate and the holding teeth or comb. Fig. 4 is a sectional view on line $x$, Fig. 3; and Fig. 5 is a sectional view on line $y$, Fig. 3.

In said drawings, $a$ indicates the tail of a horse, to which is secured my improvement, in which $b$ $c$ indicate the two parts of the body or shield united together by a hinge $d$ or any preferred pivotal connection. This body or shield is made of sheet metal, leather, or any desired substance and is curved in cross-section, as shown in Figs. 4 and 5, and longitudinally, as shown in Fig. 1. This shield is formed, preferably, with an opening $e$, as shown in Fig. 2; but when it is desired to utilize the shield as designating the name this opening is covered by a removable plate $f$, secured to the shield by clamps $g$, as shown in Fig. 3. To the outer edges of the two parts of the shield are secured or pivoted holding-straps $h$, one end of each of said straps being provided with elongated slots $i$, as shown in Fig. 3, and the other end provided with shouldered pins $k$ (shown in Fig. 4) and adapted to enter and be held in the slots $i$. Upon the upper part of the inside of the body or shield are secured a series of pointed pins or teeth $m$, extending downward, as shown in Fig. 3, and adapted to engage with the hair of the tail and prevent its slipping.

My improved device is especially useful in preventing the rubbing or wearing of the hair of the tail against the dasher or front of a carriage or wagon when a horse is attached to it, and also from wear against the sides of a stall in which it may be standing, or from the sides or parts of a car or boat in which it is transported.

The device can also be used as an indicator by having the name or anything shown on the central plate, and this plate being removable and the shield being adapted to receive other plates its use is unlimited.

The outside of the shield can be made of any desired contour and can be engraved or emblazoned in any desired manner, thus making the device very ornamental.

The device can be applied to any portion of the tail, as will be understood.

When desired, the shield can be made from one piece of metal.

Having thus described my invention, what I claim as new is—

1. In a tail-protector, the combination, with a curved tail-plate, of a detachable ornamental plate secured to the inside of said tail-plate, two sets of strips or bands fastened to the edge of said plate and adapted to form when closed a clasp for the tail, and teeth or pins extending downward on the inside of said plate adapted to engage the hair of the tail, all said parts being adapted and arranged to operate substantially as described, and for the purposes set forth.

2. In a tail-protector, the combination, with a curved tail-plate composed of two parts pivoted together in the center, of a detachable ornamental plate secured to the inside of said tail-plate, strips or bands fastened to the edge of said plate and adapted to form when closed a clasp for the tail, and teeth or pins extending downward on the inside of said plate adapted to engage the hair of the tail, all said parts as described and set forth.

In testimony that I claim the foregoing I have hereunto set my hand this 8th day of June, 1891.

ANTON DIEBOLD.

Witnesses:
    E. L. SHERMAN,
    ANTON DIEBOLD, Jr.